July 16, 1935.   L. B. McGUIGAN   2,008,330
AUTOMOBILE WHEEL
Filed Dec. 7, 1934   5 Sheets-Sheet 1

Inventor
Louis B. McGuigan
By Clarence A. O'Brien
Attorney

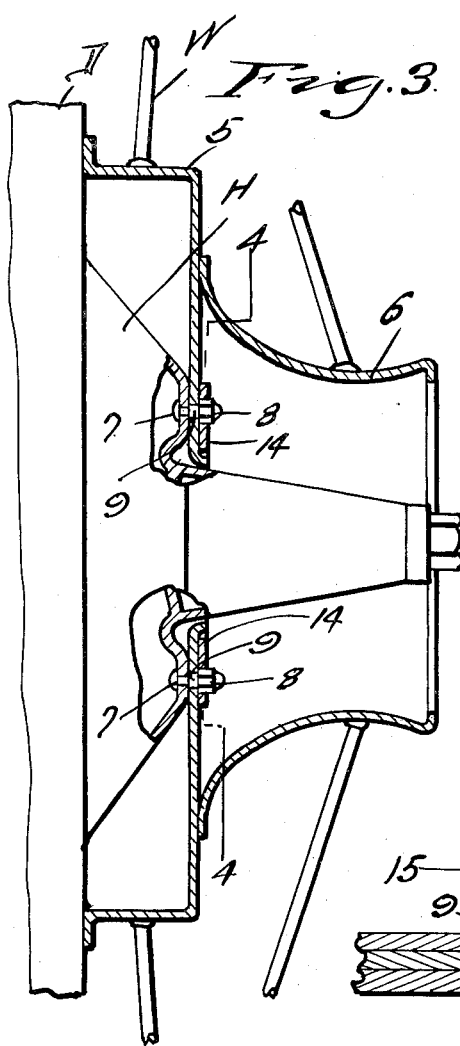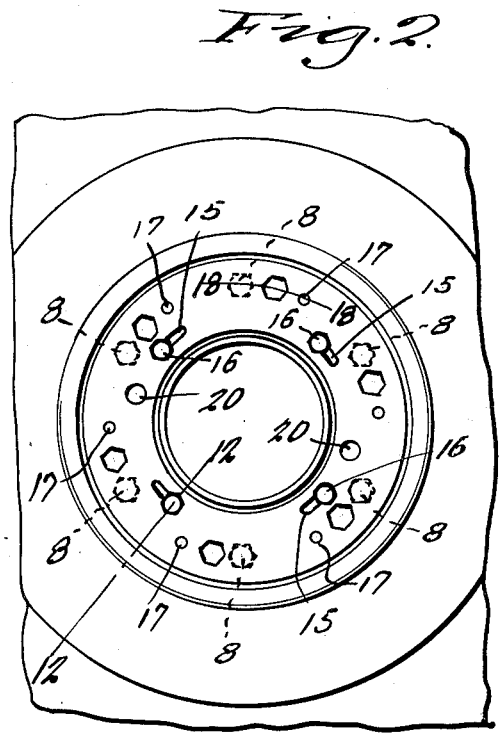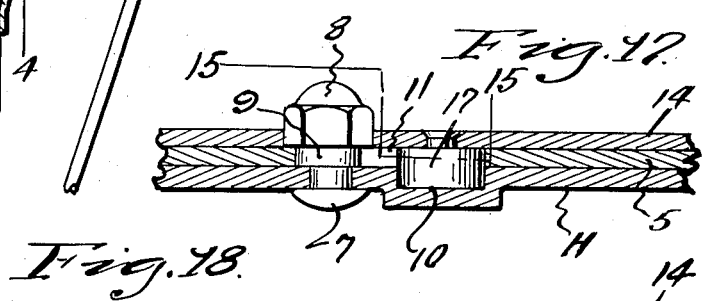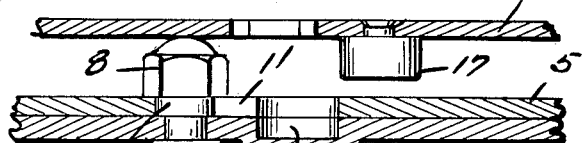

Inventor
Louis B. McGuigan
By Clarence A. O'Brien
Attorney

July 16, 1935.  L. B. McGUIGAN  2,008,330
AUTOMOBILE WHEEL
Filed Dec. 7, 1934   5 Sheets-Sheet 4

Inventor
Louis B. McGuigan

By Clarence A. O'Brien
Attorney

July 16, 1935.  L. B. McGUIGAN  2,008,330
AUTOMOBILE WHEEL
Filed Dec. 7, 1934   5 Sheets-Sheet 5
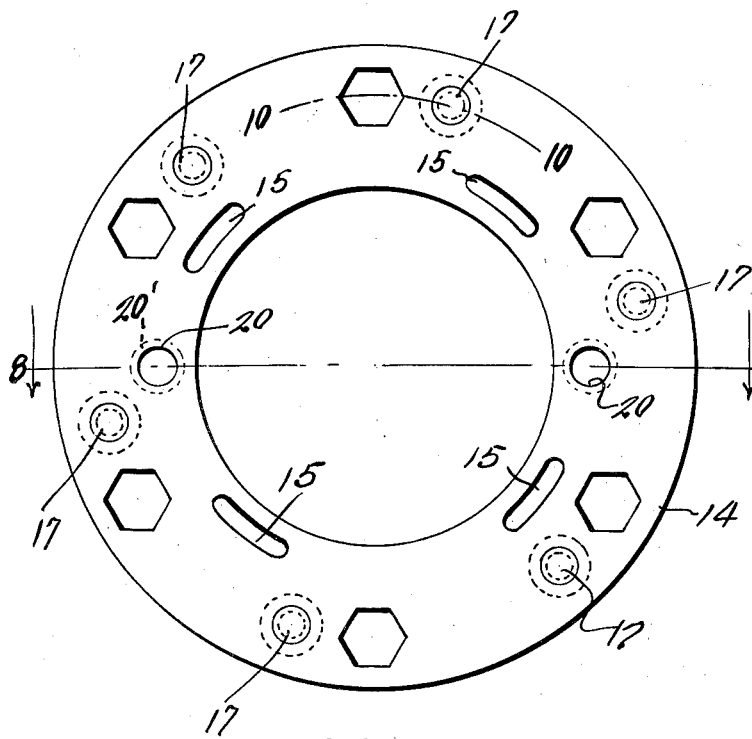
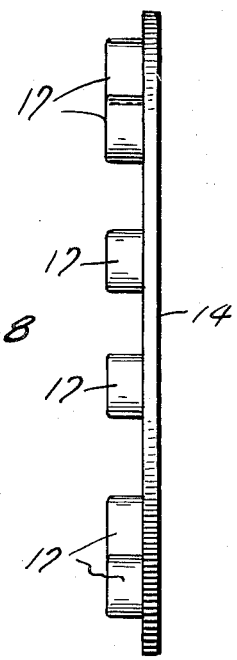
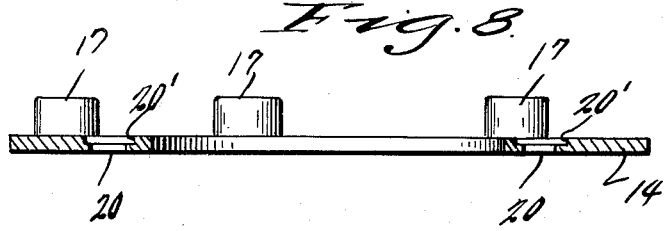
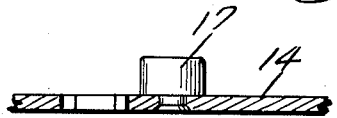
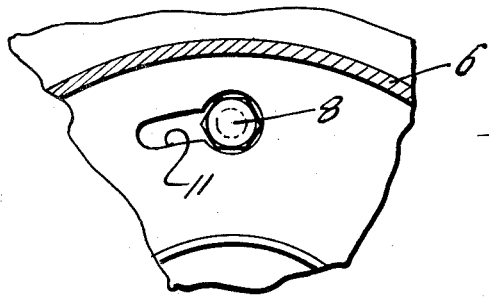
Inventor
Louis B. McGuigan
By Clarence A. O'Brien
Attorney Patented July 16, 1935

2,008,330

UNITED STATES PATENT OFFICE 2,008,330

AUTOMOBILE WHEEL

Louis B. McGuigan, Bryn Mawr, Pa.

Application December 7, 1934, Serial No. 756,521

3 Claims. (Cl. 301—9)

The present invention relates to a vehicle wheel such as is used on automobiles and the like and the object of the invention resides in the provision of a demountable wheel in conjunction with a hub and quick operating means whereby the wheel may be easily and quickly mounted on and demounted from the hub.

A further important object of the invention resides in the provision of an improved structure of this nature which is simple, easy to manipulate, compact and convenient in its arrangement of parts, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 2 is a fragmentary view showing the central portion of the wheel removed from the hub.

Figure 3 is an enlarged detail section taken substantially on the line 3—3 of Figure 1.

Figure 7 is a detail elevation of the locking plate.

Figure 8 is a sectional view therethrough substantially on the line 8—8 of Figure 7.

Figure 9 is an edge elevation thereof.

Figure 10 is a detail sectional view therethrough substantially on the line 10—10 of Figure 7.

Figure 14 is a side elevation of one of the bolts for holding the locking plate in place.

Figure 16 is a detail sectional view taken substantially on the line 16—16 of Figure 19.

Figure 17 is a detail sectional view taken substantially on the line 17—17 of Figure 1.

Figure 18 is a similar view showing the locking plate pulled outwardly and turned.

Figure 19 is a view similar to Figure 18 but showing the wheel turned ready to be demounted.

Figure 1:
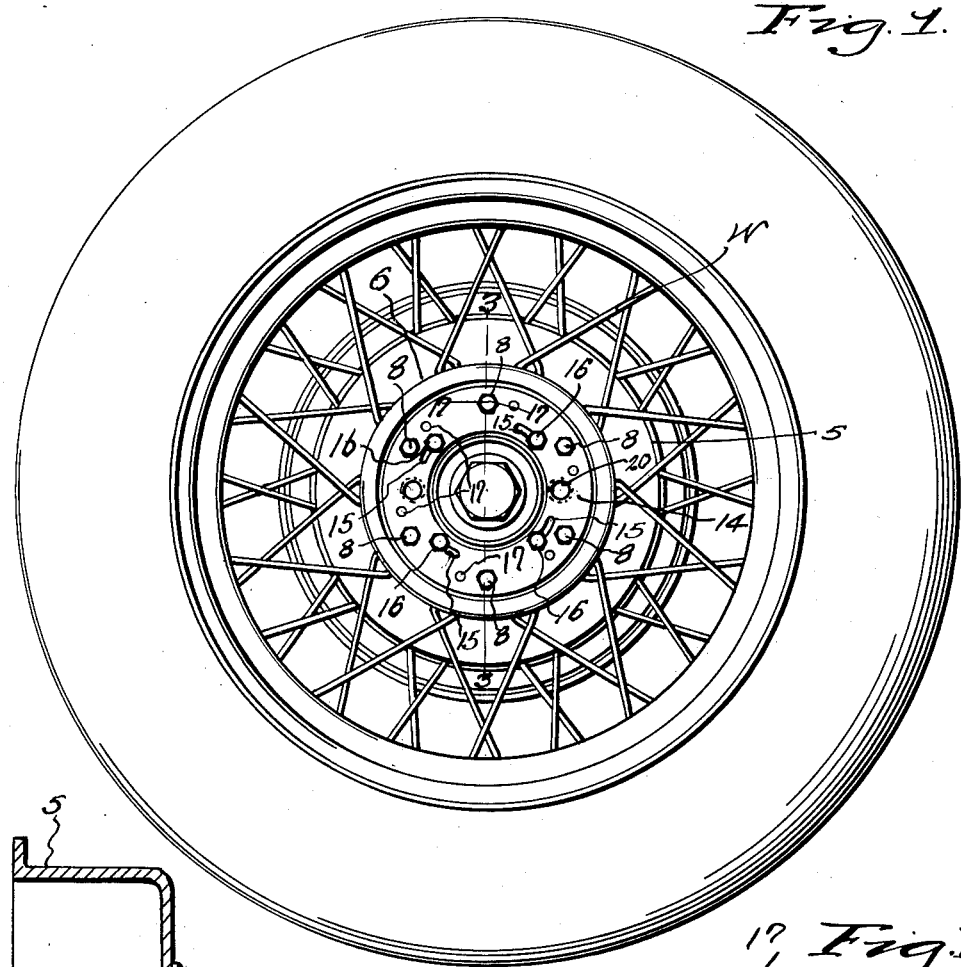
Figure 1 is a side elevation of a wheel embodying the features of my invention showing the hub cap removed.

Referring to the drawings in detail it will be seen that the letter H denotes a flange on the inner hub fixed in the usual manner to a brake drum D. The letter W denotes generally the demountable wire spoke wheel having the hub shell sections 5 and 6 from which the spokes extend outwardly as is well known. The parts thus far described are more or less conventional. Reference is now had more particularly to what I consider to be my improved construction. Bolts 7 are mounted in the hub flange H and project outwardly somewhat similarly to the ordinary stud bolts now in common use. Nuts 8 are threadedly engaged with the bolts and have inner reduced ends 9. Adjacent each bolt 7 the hub is formed with a pocket or recess 10. A portion of the hub shell 5 is formed with a series of annularly arranged arcuate keyhole slots 11, one for each nut 8 and pocket 10. By turning the wheel, see Figures 18 and 19, in one direction the narrow portions of the slots engage the inner reduced ends of the nuts for mounting the wheel in place and to remove the wheel, said wheel is turned in the other direction so that the larger portions of the slots may pass over the nuts while the wheel is being demounted.

Figure 12:
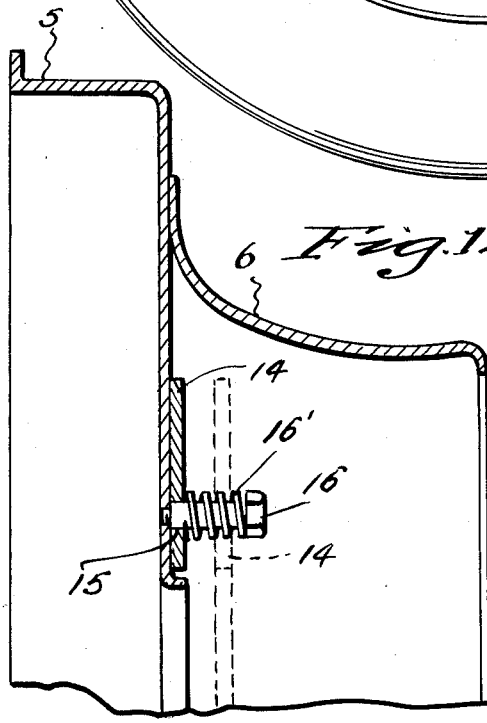
Figure 12 is an enlarged detail sectional view taken substantially on the line 12—12 of Figure 2.
Figure 13:
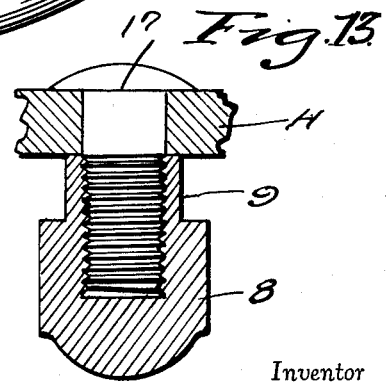
Figure 13 is an enlarged detail sectional view through one of the bolt and nut assemblies taken substantially on the line 13—13 of Figure 11.
Figure 4:
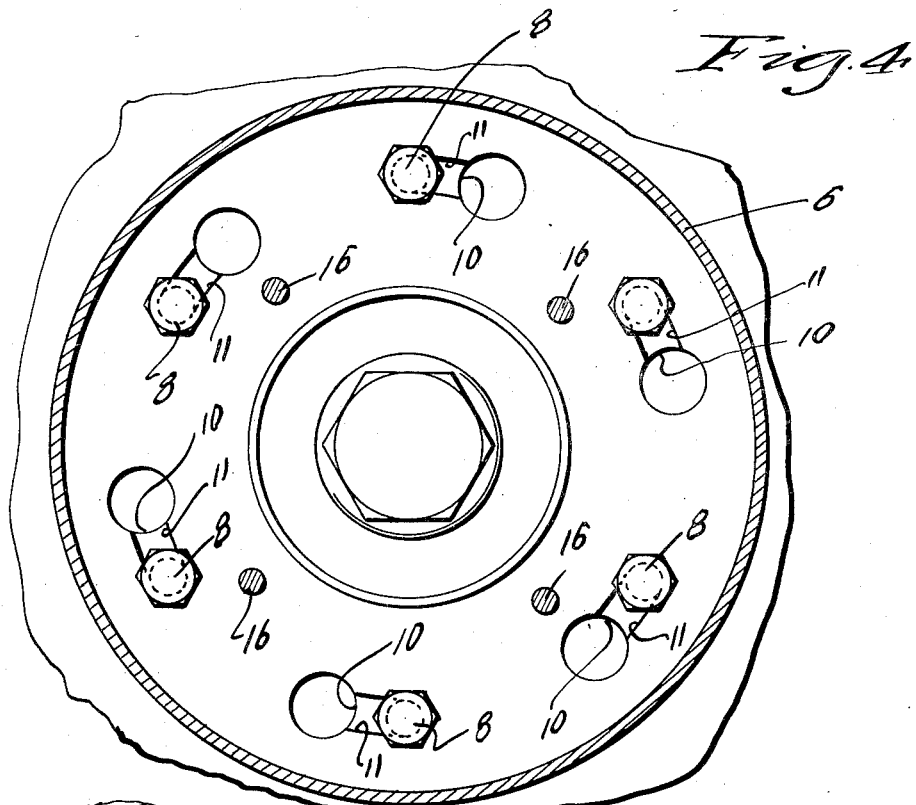
Figure 4 is a sectional view taken substantially on the line 4—4 of Figure 3.
Figure 5:
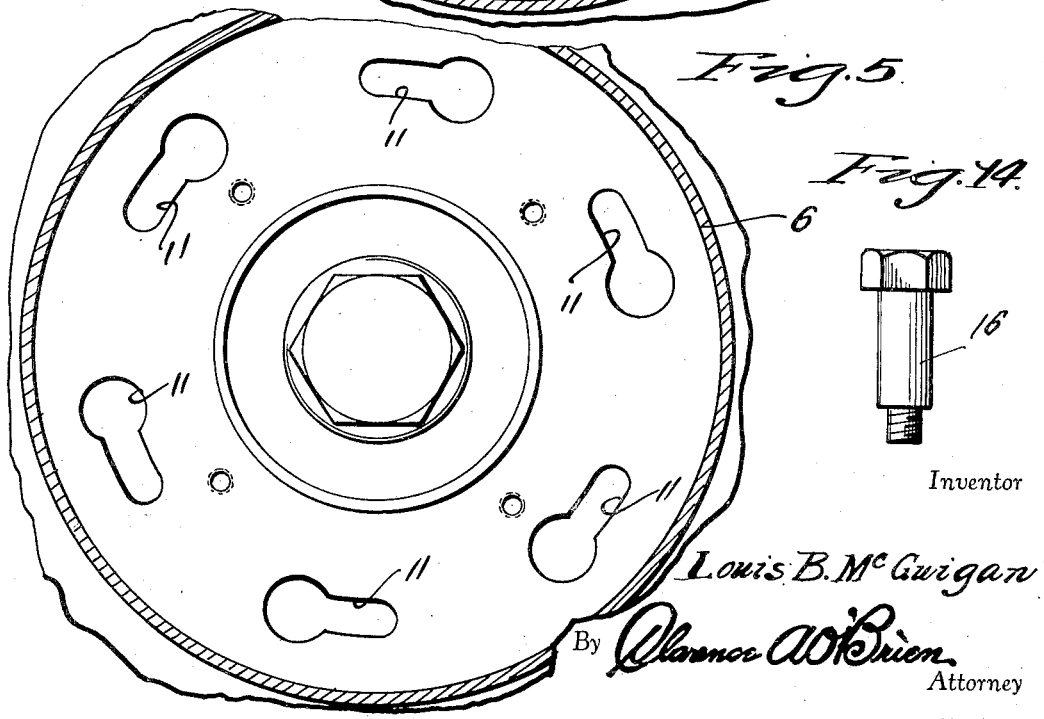
Figure 5 is a somewhat similar sectional view without showing the bolt for holding the locking plate and the nuts and bolts on the hub.
Figure 4A:
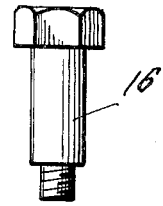
Figure 6:
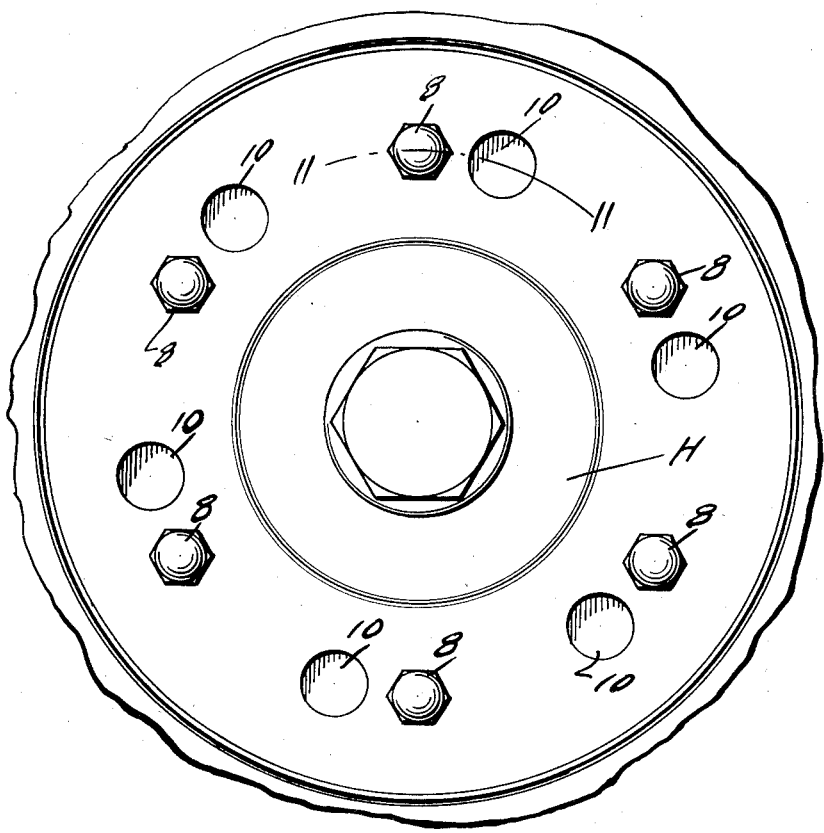
Figure 6 is a detail elevation of the hub.
Figure 15:
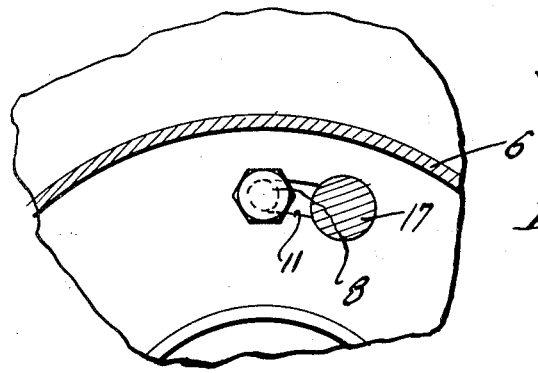
Figure 15 is a detail sectional view taken substantially on the line 15—15 of Figure 17.
Figure 11:
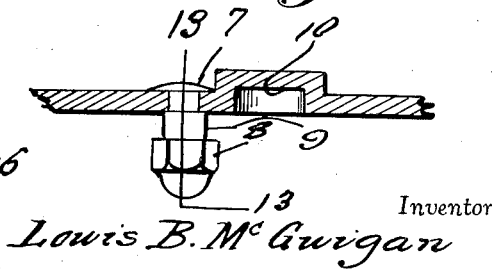
Figure 11 is a detail section taken substantially on the line 11—11 of Figure 6.

The numeral 14 denotes a circular locking plate which is formed with a series of annularly arranged arcuate slots 15 (see particularly Figures 2 and 7 and the detail section in Figure 12). Bolts 16 (see particularly Figures 12 and 14) mounted in the wheel, project through the slots 15. Springs on the bolts 16 are denoted by numeral 16' and impinge against the outer surface of the plate 14. Lugs 17 (see Figures 8, 9, 10, 17, 18 and 19) are fixed on the inner surface of the plate 14 and are arranged in an annular series and are of such size and shape as to be projectable into and to fill the larger portions of the slots 11 and the pockets 10 (see Figure 17). The plate 14 is provided with a pair of openings 20 diametrically opposed and counter-sunk on the inner surface of the plate as indicated at 20'. These openings are provided so that an implement or implements may be engaged therewith and the plate pulled outwardly from the position shown in Figure 17 to the position shown in Figure 18 and then the plate is rotated in a clockwise direction to assume the position shown in Figure 18. Then the wheel is moved from the position shown in Figure 18 counter-clockwise to the position shown in Figure 17 and the larger portions of the slots 11 are free to clear the nuts 8 and the wheel may be demounted. To mount the wheel, of course, the operation is reversed and when the parts have assumed the position shown in Figure 17 it will be seen that they are locked against any accidental displacement because of the lugs 17 filling the larger portions of the slots 11 and the pockets or recesses 10 and the springs 16' holding the plate against the wheel, that is the hub shell 5.

It is thought that the construction, operation, utility and advantages of this invention will now be clearly understood by those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention what I claim as new is:

1. In a wheel assembly, and in combination, a hub structure, a demountable wheel having a hub shell cooperable with the hub structure for mounting the wheel thereon, bolts arranged in an annular series and projecting outwardly from the hub structure, nuts on the bolts having reduced inner ends, said hub shell having an annular series of keyhole slots for cooperation with the nuts in mounting and demounting the wheel, a plurality of lugs projectable into the larger ends of the keyhole slots, and the hub structure provided with pockets to receive said lugs, means for mounting the lugs on the hub shell and means urging the lugs inwardly.

2. In a wheel assembly, and in combination, a hub structure having pockets therein, a demountable wheel having a hub shell cooperable with the hub structure for mounting the wheel thereon, bolts arranged in an annular series and projecting outwardly from the hub structure, nuts on the bolts having reduced inner ends, said hub shell having an annular series of keyhole slots for cooperation with the nuts in mounting and demounting the wheel, a locking ring having an annularly arranged series of arcuate slots and an annular series of openings to receive the larger portions of the nuts, bolts fixed to the hub shell and projecting through the slots to secure the locking ring to the hub shell, and a plurality of lugs projecting from the inner surface of the locking ring in annular series for projecting into and filling the larger ends of the key-hole slots and said pockets in the hub structure.

3. In a wheel assembly, and in combination, a hub structure having pockets therein, a demountable wheel having a hub shell cooperable with the hub structure for mounting the wheel thereon, bolts arranged in an annular series and projecting outwardly from the hub structure, nuts on the bolts having reduced inner ends, said hub shell having an annular series of keyhole slots for cooperation with the nuts in mounting and demounting the wheel, a locking ring having an annularly arranged series of arcuate slots, an annular series of openings to receive the larger portions of the nuts, and a plurality of lugs projecting from the inner surface thereof in an annular series for projecting into and filling the larger ends of the keyhole slots and the pockets provided in the hub structure, bolts fixed to the hub shell and projecting through the arcuate slots of the ring and springs on the bolts impinging against the ring to urge the plate inwardly.

LOUIS B. McGUIGAN.